March 16, 1954 F. L. LE BUS 2,672,380
THRUST BEARING AND SEAL FOR IDLER UNITS
Filed July 15, 1950

INVENTOR.
F. L. LeBus
BY
C. M. McKnight
ATTORNEY

Patented Mar. 16, 1954

2,672,380

UNITED STATES PATENT OFFICE 2,672,380

THRUST BEARING AND SEAL FOR IDLER UNITS

Franklin L. Le Bus, Longview, Tex.

Application July 15, 1950, Serial No. 174,077

1 Claim. (Cl. 308—36.1)

This invention relates to improvements in combination thrust bearings and seals and more particularly, but not by way of limitation, to improved combination thrust bearings and seals for idler units such as sheaves, pulleys, idler gears and the like.

In the majority of the present day cable, belt and chain drive systems, one or more idler units are utilized which are adapted to rotate freely on stationary shafts. These idler units are generally provided with suitable bearings of the sleeve or roller type between their hubs and the shafts on which they rotate. If oil and dirt seals are not provided on the opposite sides of the hub bearings, the lubricant which must necessarily be supplied between the bearing and the shaft is worked out through the ends of the bearing in a reasonably short period of time. In addition, foreign abrasive matter is likely to enter the bearings and materially shorten the service life thereof. As idler units are rotated, they are frequently subjected to excessive side thrusts, causing the hubs of the units to contact the stationary stop collars or the like disposed on the opposite sides thereof for retaining the units in the desired axial positions. When an end of one of the hubs contacts a stop collar, the free rotation of the unit is impaired and the hub or stop collar may be damaged.

The present day practice, where economically practical, is to provide an oil and dirt seal as one unit and a thrust bearing as a separate unit on the opposite sides of the idler units. The thickness of the thrust bearings and seals is such, however, that a material portion of the hub bearing space is utilized for their installation and the overall width of the unit is unduly extended. Frequently, the space in which the idler unit must be installed is limited to such an extent that the thrust bearing and seal units cannot be used.

The present invention contemplates a combination thrust bearing and seal of minimum thickness for use on each side of an idler unit. To obtain the desired result, a sealing ring is disposed at each end of an idler unit hub bearing in sealing relation with the bearing and the supporting shaft for retaining a lubricant within the bearing and for preventing the entrance of foreign matter into the bearing. The sealing rings are retained in the desired position by hub caps formed out of a suitable bearing or anti-friction material secured to the ends of the idler hub unit. The hub caps also provide practical thrust bearings at each side of the idler unit.

An important object of this invention is to reduce the hub bearing space of idler units presently required for the installation of seals and thrust bearings.

Another object of this invention is to reduce the overall width of idler unit assemblies utilizing thrust bearings and seals.

A further object of this invention is to provide a combination thrust bearing and seal which may be conveniently used on existing idler units.

A still further object of this invention is to provide an efficient and practical combination thrust bearing and seal for use on idler units which may be economically manufactured.

Other objects and advantages of the invention will be evident from the following detailed description, read in conjunction with the accompanying drawings, which illustrate my invention.

Figure 1:
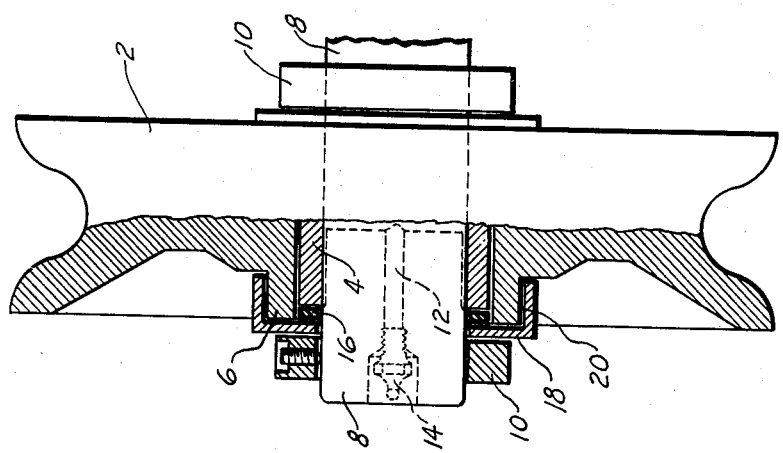
Figure 1 is an elevational view of a sheave, partially in section, utilizing novel combination thrust bearings and seals.

Referring to the drawings in detail, and particularly Figure 1, reference character 2 designates a wire line or rope sheave. The sheave is provided with a sleeve-type hub bearing 4 having its opposite ends in inwardly spaced relation to the opposite ends of the sheave hub 6 for purposes as will be hereinafter set forth. The sheave 2 is rotatably supported on a stationary shaft 8 and is retained in the desired axial position on the shaft by stop collars 10, or the like. The hub bearing 4 is lubricated in the usual manner by passageways 12 in the shaft 8 communicating with a lubrication fitting 14.

A sealing ring 16 of uniform cross section is provided at each end of the hub bearing 4 in sealing relation with the supporting shaft 8. The sealing rings 16 are retained in sealing contact with the hub bearing 4, as well as the shaft 8, by a pair of apertured hub caps 18 formed out of any suitable anti-friction or bearing material. The hub caps 18 fit loosely about the shaft 8 and make a drive fit with the outer periphery 20 of each end of the hub 6. It will be apparent that the hub caps 18, in addition to retaining the sealing rings 16 in the desired position, serve as thrust bearings between the opposite sides of the sheave 2 and the stop collars 10.

It is readily seen that the sealing rings and hub caps may take many different shapes or forms and may be applied to other types of idler units.

Figure 2:
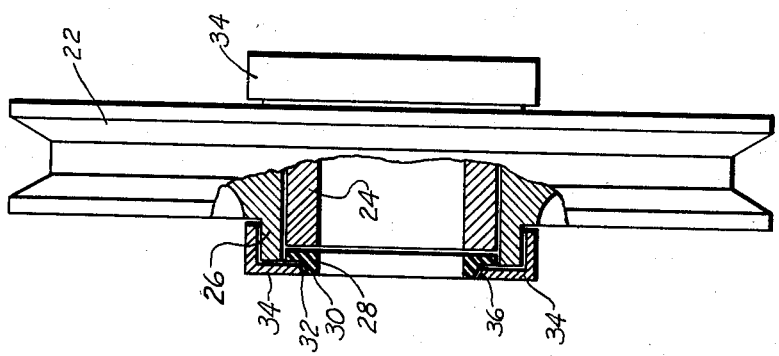
Figure 2 is an elevational view of a V-belt pulley, partially in section, utilizing modified combination thrust bearings and seals.

Another typical application of the present invention is illustrated in Figure 2, wherein reference character 22 designates a V-belt type pulley provided with a sleeve-type hub bearing 24 having its opposite ends in inwardly spaced relation to the opposite ends of the pulley hub 26. The pulley 22 may be rotatably supported on a shaft, and the hub bearing 24 may be lubricated, in a manner similar to that shown in Figure 1.

A sealing ring 28 having an outwardly extending flanged portion 30 adjacent the inner periphery thereof is provided at each end of the hub bearing 24. The outer surface 32 of the flanged portion 30 is tapered for purposes as will be hereinafter set forth. A hub cap 34 formed out of a suitable anti-friction or bearing material and having a tapered wall aperture 36 of larger diameter than the supporting shaft (not shown) is driven onto each end of the hub 26. The hub caps 34 retain the sealing rings 28 securely against the ends of the hub bearing 24, and the tapered walls of the apertures 36 contact the tapered surfaces 32 of the sealing ring flanged portions 30 to insure the maximum sealing effect on the supporting shaft. It will be apparent that the hub caps 34 also serve as thrust bearings for the pulley 22.

Figure 3:
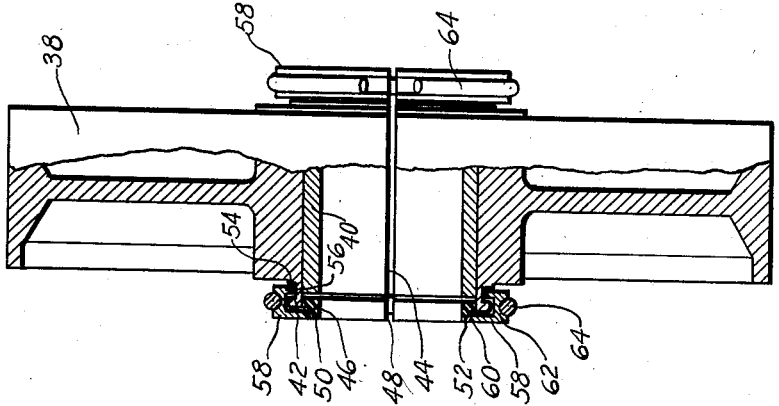
Figure 3 is an elevational view of a split idler pulley, partially in section, utilizing further modified combination thrust bearings and seals.

A third typical application of the present invention is illustrated in Figure 3, wherein reference character 38 designates a split-type smooth-faced pulley provided with a sleeve-type hub bearing 40 having its opposite ends in inwardly spaced relation to the opposite ends of the pulley hub 42. The sections of the pulley 38 are adapted to be joined at 44 around a supporting shaft (not shown) and rotatable thereon.

A sealing ring 46, split at 48 to facilitate installation on the supporting shaft, is provided at each end of the hub bearing 40. Each sealing ring 46 has an outwardly extending flanged portion 50 adjacent its inner periphery. The outer surfaces 52 of the flanged portions 50 are tapered for purposes as will be hereinafter set forth. Each end of the hub 42 is provided with a circumferential groove 54 for receiving the inwardly flanged end portion 56 of a split hub cap 58. The hub caps 58 are provided with tapered wall apertures 60 of greater diameter than the supporting shaft (not shown). It will be apparent that the walls of the tapered apertures 60 contact the tapered portions 52 of the sealing rings 46 to increase the efficiency of the seal on the supporting shaft, and that the hub caps 58 retain the sealing rings 46 in sealing relation with the hub bearing 40. A circumferential groove 62 is provided in the outer periphery of each to receive a spring 64. The springs 64 retain the entire idler unit in assembly on the supporting shaft.

Although a sleeve-type hub bearing has been illustrated in the various idler units, the present invention may be used with equal efficiency on idler units having roller-type bearings.

From the foregoing, it will be apparent that utilization of the present invention requires a minimum of hub bearing space and does not substantially increase the overall length of an idler unit. It will also be apparent that the present invention produces a practical thrust bearing and seal which may be conveniently used on existing idler units.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

In an idler unit having a hub rotatably mounted on a hub bearing, the combination of sealing rings mounted in the hub at opposite ends of the hub bearing, a portion of the outer end face of each sealing ring being tapered radially inward away from the hub bearing, and hub caps formed of bearing material and secured one at each end of the hub for retaining the sealing rings and hub bearing in operating position and providing a thrust member at each side of the idler unit, the inner periphery of each hub cap being tapered to conform to the outer face of the respective sealing ring for pressing the sealing rings radially inward.

FRANKLIN L. LE BUS.

References Cited in the file of this patent

UNITED STATES PATENTS

| Number | Name | Date |
| --- | --- | --- |
| 901,866 | Atkinson | Oct. 20, 1908 |
| 962,629 | Fowle | June 28, 1910 |
| 1,778,060 | Briggs | Oct. 14, 1930 |
| 2,187,777 | Gannett | Jan. 23, 1940 |
| 2,237,921 | Baker | Apr. 8, 1941 |
| 2,259,648 | Lucas | Oct. 21, 1941 |
| 2,617,698 | Gaines | Nov. 11, 1952 |

FOREIGN PATENTS

| Number | Country | Date |
| --- | --- | --- |
| 151,904 | Great Britain | Oct. 7, 1920 |